Jan. 3, 1939.  R. KAISER  2,142,358
SPRING SUPPORTED SEAT FOR MOTOR VEHICLES
Filed Feb. 12, 1938
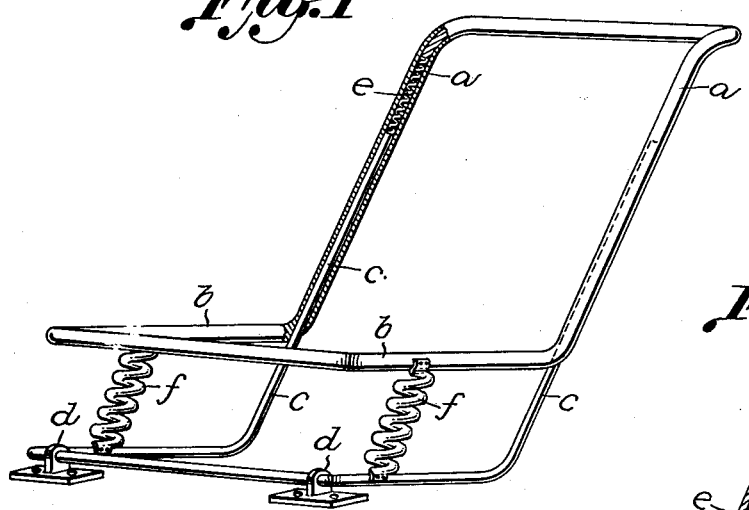
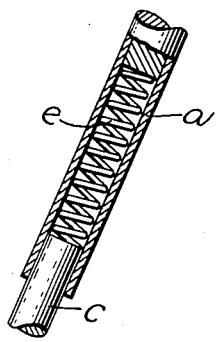
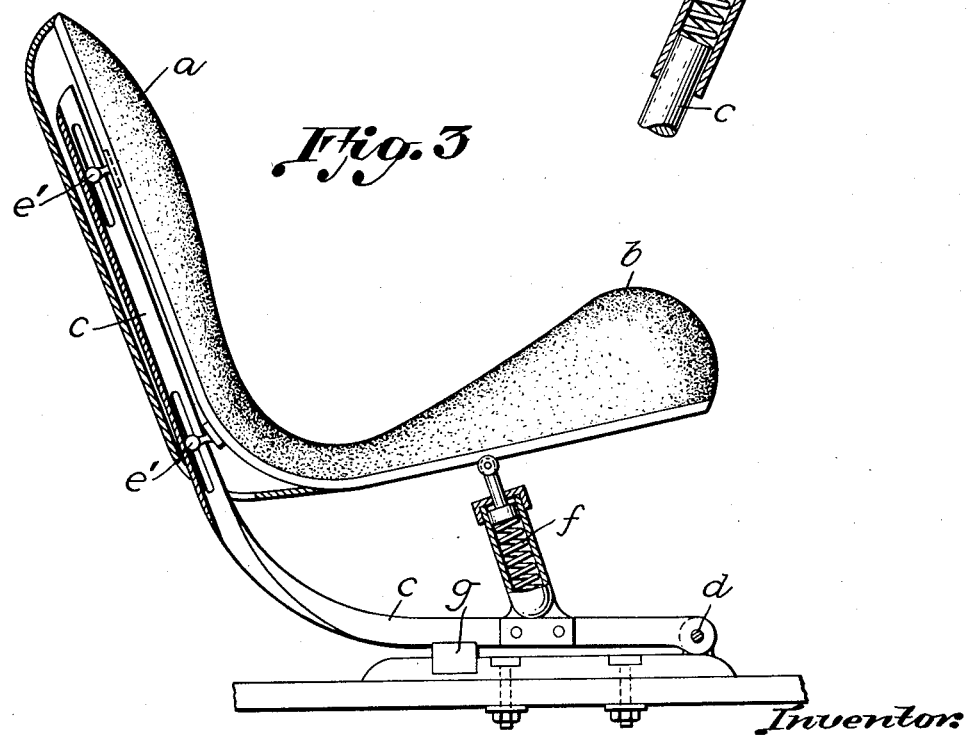
Inventor:
RUDOLF KAISER
By Ferd. Nusch
Attorney.

Patented Jan. 3, 1939

2,142,358

UNITED STATES PATENT OFFICE 2,142,358

SPRING SUPPORTED SEAT FOR MOTOR VEHICLES

Rudolf Kaiser, Planitz, near Zwickau, Germany

Application February 12, 1938, Serial No. 190,248
In Germany February 11, 1937

3 Claims. (Cl. 155—9)

This invention relates to a spring supported seat for motor vehicles in which the back and the seat proper are mounted as a complete unit in guides, in order to allow common up and down vibrating of the seat and of the back connected therewith.

It is known in spring supported seats to rigidly connect the seat with the back and to mount them as a complete unit in guides. These known seats are, however, open to the objection that there is insufficient clearance either under the seat for the feet of the occupants of the rear seats or for entering when the seat is swung forwards.

According to the invention, the seat with back formed in known manner as a continuous steel tube frame is placed on a steel U-frame and resiliently mounted in the same, while two buffer springs are fitted as main spring suspension between the seat and the U-frame.

According to a modified form of construction the seat is guided at both sides on a U-frame adapted to swing forward on hinges and serving as support for the buffer springs of the seat.

These seats can easily be dismantled and assembled and allow foot clearance under the seat.

Two embodiments of the invention are illustrated by way of example, in the accompanying drawing in which:—

Fig. 1 is a perspective view showing the two-part steel tube frame of a seat.

Fig. 2 is a longitudinal section of part of one of the upright portions of the frame forming the back of the seat.

Fig. 3 shows in side elevation a seat with roller guides for the back.

According to the construction shown in Fig. 1 the seat $b$ and back $a$ are formed by a continuous steel tube frame, and a swing U-frame $c$ forms a tubular fork connected to the floor of the vehicle by hinges $d$ said fork being slipped into the two back tubes $a$. In each back tube $a$ a helical spring $e$ is located so that the seat with back is resiliently supported on the U-frame $c$ to produce, together with buffer springs $f$ fitted between the seat $b$ and a U-frame $c$, a vibrationless support for the seat. The steel tube frame may be used for fixing either springless seat straps or seat and back upholstering.

According to the example illustrated in Fig. 3 the U-frame $c$ serves as guide for the back $a$ with seat $b$ and is secured to the floor of the vehicle by a hinge joint $d$. Buffer springs $f$ are fitted between the seat $b$ and the two arms of the U-frame $c$. The seat with the back is guided in the U-frame $c$ by rollers $e'$, and tension springs may also be fitted here to assist the buffer springs $f$.

These seats have foot clearance, and when the U-frame is swung forward with the seat and back, the springs $f$ move therewith and thus leave the whole of the interior of the vehicle free for entering.

The rubber cushions $g$ serve as buffers when the seat is being swung into position for use.

I claim:—

1. In a spring supported seat for motor vehicles, a U-shaped frame pivotally mounted at the forward end thereof with the free ends of the side legs of the frame extending angularly upwardly, a seat frame having a back portion slidable on the upwardly extending angular portions of the U-shaped frame, and a seat portion overlying the lower end of said U-shaped frame and buffer springs interposed between the seat portion and lower portion of said U-shaped frame, the U-shaped frame and seat frame resiliently supported thereon being unitarily movable on the pivotal mounting for the U-shaped frame.

2. In a spring supported seat for motor vehicles, a U-shaped frame pivotally mounted at the forward end thereof with the free ends of the side legs of the frame extending angularly upwardly, a seat frame having a back portion slidable on the upwardly extending angular portions of the U-shaped frame, and a seat portion overlying the lower end of said U-shaped frame and buffer springs interposed between the seat portion and lower portion of said U-shaped frame, the U-shaped frame and seat frame resiliently supported thereon being unitarily movable on the pivotal mounting for the U-shaped frame, the back portion of the seat frame being of tubular formation for slidably receiving the upper ends of the upwardly inclined portions of the U-shaped frame and compression springs interposed between the upper end of the back portion and the upper ends of the U-shaped frame.

3. In a spring supported seat for motor vehicles, a U-shaped frame pivotally mounted at the forward end thereof with the free ends of the side legs of the frame extending angularly upwardly, a seat frame having a back portion slidable on the upwardly extending angular portions of the U-shaped frame, and a seat portion overlying the lower end of said U-shaped frame and buffer springs interposed between the seat portion and lower portion of said U-shaped frame, the U-shaped frame and seat frame resiliently supported thereon being unitarily movable on the pivotal mounting for the U-shaped frame, and guide rollers arranged between the back portion of the seat frame and the upwardly inclined portions of the U-shaped frame.

RUDOLF KAISER.